United States Patent [19]

Amsden et al.

[11] 4,024,009

[45] May 17, 1977

[54] APPARATUS AND METHOD FOR WELDING A POLYETHYLENE SLEEVE LABEL TO A POLYETHYLENE BOTTLE

[75] Inventors: Donald L. Amsden, Toledo; Casimir W. Nowicki, Sylvania, both of Ohio

[73] Assignee: Owens-Illinois, Inc., Toledo, Ohio

[22] Filed: Feb. 10, 1975

[21] Appl. No.: 548,541

[52] U.S. Cl. ............................. 156/272; 40/310; 156/294; 215/1 C

[51] Int. Cl.² .................. B29C 19/02; C09J 5/00; G09F 3/00

[58] Field of Search ............. 156/380, 499, 272, 86, 156/294, DIG. 18, DIG. 9, DIG. 51; 40/310, 40/2.2; 215/1 C; 283/21

[56] References Cited

UNITED STATES PATENTS

| | | | |
|---|---|---|---|
| 2,684,775 | 7/1954 | Von Hofe | 156/DIG. 18 |
| 2,829,791 | 4/1958 | Berst | 156/499 |
| 3,207,822 | 9/1965 | Makowski | 264/94 |
| 3,382,121 | 5/1968 | Sherlock | 156/86 |
| 3,470,046 | 9/1969 | Verdin | 156/294 |
| 3,480,168 | 11/1969 | Lee | 215/1 C |
| 3,560,291 | 2/1971 | Foglia et al. | 156/306 |
| 3,582,457 | 6/1971 | Barthell | 156/86 |
| 3,723,212 | 3/1973 | Casper | 156/273 |

Primary Examiner—Douglas J. Drummond
Attorney, Agent, or Firm—Robert F. Rywalski; Edward J. Holler; Richard D. Heberling

[57] ABSTRACT

There is disclosed an apparatus and method for attaching securely a polyethylene sleeve label to a polyethylene bottle, the bottle having a neck, a body and a bottom. The apparatus comprises means for holding the polyethylene bottle with the sleeve label, and welding means for welding the label to the body of the bottle to prevent loss of the label, the welding means including heating means located away from the label and not in contact therewith.

6 Claims, 1 Drawing Figure

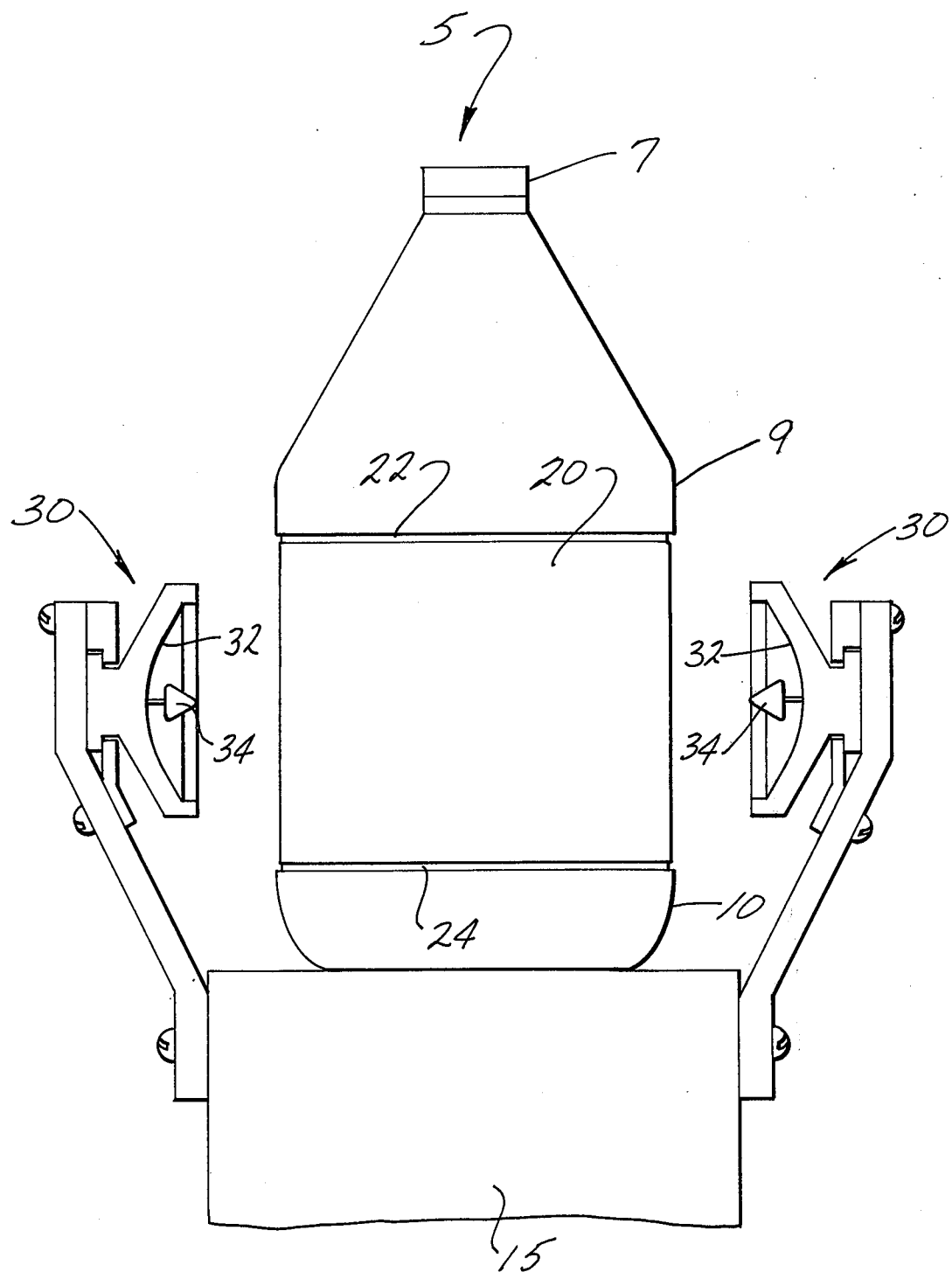

APPARATUS AND METHOD FOR WELDING A POLYETHYLENE SLEEVE LABEL TO A POLYETHYLENE BOTTLE

THE INVENTION

The present invention is directed to an apparatus and method for attaching securely a polyethylene sleeve label to a polyethylene bottle by welding the label to the body of the bottle to thereby prevent loss of the label.

The present invention is also directed to the bottle itself, the bottle being a polyethylene bottle with a polyethylene sleeve label welded thereto by heating means located away from the label and not in contact therewith.

The present invention solves a problem in the production of polyethylene bottles on a continuous, high-speed basis, in which the labels are securely attached to the body of the polyethylene bottle by welding means that includes heating means located away from the label and not in contact therewith.

It is desirable that some polyethylene bottles, for instance bottles containing poisons, have polyethylene sleeve labels that are attached securely so that they will not be separated from the bottle. Thus, warning of poison materials printed on the labels will be attached permanently to the bottle.

In the past, there has been an attempt to secure polyethylene film sleeve labels to polyethylene bottles by a hot iron which touches the film located around the body. This method of securing the label has not been entirely satisfactory and, generally, has resulted in the tearing of the film label and some distortion of the bottle and the printed label by the contact of the hot iron.

It is an object of the present invention to provide an apparatus for securely attaching a polyethylene sleeve label to a polyethylene bottle, the apparatus including welding means to weld the label to the bottle so as to thereby prevent loss of the label, the welding means including heating means located away from the label and not in contact therewith.

These and other objects will be apparent from the specification that follows, the appended claims and the drawings in which:

The FIGURE shows a schematic, elevational view of a polyethylene bottle with a polyethylene sleeve label and heating means for welding the polyethylene sleeve label to the bottle.

The present invention provides a method for attaching a polyethylene sleeve label to a polyethylene bottle, the method comprising the steps of:
a. supporting the bottle with a label located around the body thereof; and
b. welding the label to the bottle by heating means spaced away from the label to thereby prevent loss of the label from the bottle.

The present invention also provides a polyethylene bottle having a polyethylene sleeve label welded thereto on its body portion on the outer surface thereof, the welding being accomplished by heating means not in contact with the label.

The present invention provides an apparatus and method for attaching securely a polyethylene sleeve label to a polyethylene bottle 5, the bottle having a neck 7, a body 9 and a base 10. As shown in the FIGURE, there is provided holding means for supporting the polyethylene bottle. In the embodiment shown in the FIGURE, the holding means is a conveyor 15, which supports a plurality of bottles on a high-volume production line. There also is shown in the FIGURE a polyethylene sleeve label 20, having a top marginal edge 22 and a bottom marginal edge 24. As previously disclosed herein, there is provided welding means 30, comprising heating means spaced away from the label and not in contact therewith. The heating means includes parabolic reflectors 32 for heating elements 34.

In the present invention, it is found that the polyethylene sleeve label is so securely welded to the polyethylene bottle that when one attempts to remove the label, the label itself tears instead of the weld breaking. Thus, the weld is stronger than the label. In this fashion, the bottles containing poisons, etc., have the label permanently attached to the bottle so as to prevent such bottles from being used without proper warning.

The present invention is particularly useful for high-speed production in which a plurality of bottles are held and moved by a conveyor past long, infra-red heaters — one on each side of the conveyor, as set forth in the FIGURE. The welding of the sleeve label generally takes place in less than about 25 seconds and usually in about 20 to 21 seconds.

In one embodiment, the conveyor passes between two infra-red heaters approximately 4 feet long. The infra-red heating elements are spaced about 1½ inches from the label. The amount of heat on the label and bottle can be adjusted by varying the voltage applied to the heaters, the amount of heat depending upon factors such as the speed of the conveyor.

We claim:
1. A method for attaching securely a polyethylene sleeve label to a polyethylene bottle having a neck, a body and a bottom, the method comprising the steps of:
   a. supporting said bottle, said bottle having a sleeve label located on the body thereof; and
   b. welding without the use of an adhesive the label to the bottle by heating with radiant heating, means spaced away from the label and the bottle to thereby prevent loss of the label.
2. A method as defined in claim 1 in which said means includes infra-red heaters spaced away from the bottle and label.
3. A method as defined in claim 2 in which a plurality of bottles supported in an upright position are continuously conveyed between two long infra-red heaters, said heaters being disposed adjacent the conveyor and spaced away from the bottles on opposite sides thereof, said welding being effected while said bottles are conveyed between said heaters to thereby produce opposite, non-continuous welded areas.
4. A method as defined in claim 3 in which each label is welded to its respective bottle in less than about 25 seconds.
5. A method for permanently attaching a polyethylene sleeve label to a polyethylene bottle wherein said bottle has a neck, a body, and a bottom and wherein said polyethylene sleeve label is located around a portion of said body comprising welding the label to the bottle by heating with radiant heating means which are spaced away from the label and the bottle so as to produce a weld, said weld being of a strength greater than the lable such that when one attempts to remove the label the label itself tears instead of the weld breaking.
6. The method of claim 5 wherein non-continuous welds are produced by employing heating means on opposite sides of the label and body.

* * * * *